United States Patent [19]

Leder

[11] Patent Number: 5,008,022
[45] Date of Patent: Apr. 16, 1991

[54] PROCESS FOR SCAVENGING SULFIDES

[75] Inventor: Jonathan Leder, Flemington, N.J.

[73] Assignee: Union Carbide Chemicals and Plastics Technology Corporation, Danbury, Conn.

[21] Appl. No.: 328,878

[22] Filed: Mar. 27, 1989

Related U.S. Application Data

[62] Division of Ser. No. 251,362, Sep. 30, 1988, Pat. No. 4,844,877.

[51] Int. Cl.$^5$ .......................... B01D 57/00; B08B 9/02
[52] U.S. Cl. ................................... 210/755; 134/22.14
[58] Field of Search ...................... 134/22.14; 210/679, 210/681, 755

[56] References Cited

U.S. PATENT DOCUMENTS

| | | | |
|---|---|---|---|
| 3,024,192 | 3/1962 | Bennett et al. | 252/8.554 |
| 3,658,921 | 4/1972 | Wessendorf | 260/433 |
| 3,711,561 | 1/1973 | Wessendorf | 267/333 |
| 4,710,305 | 12/1987 | Allison | 210/747 |
| 4,723,044 | 2/1988 | Watanabe et al. | 568/713 |

*Primary Examiner*—Ivars Cintins
*Attorney, Agent, or Firm*—Paul W. Leuzzi, II

[57] ABSTRACT

A process and formulation are provided for the removal of sulfides from solids and fluids utilizing certain halonitroalkanols. These compounds can rapidly and quantitatively remove hydrogen sulfide, organic sulfides and their salts from solutions, particularly aqueous mixtures.

24 Claims, 1 Drawing Sheet

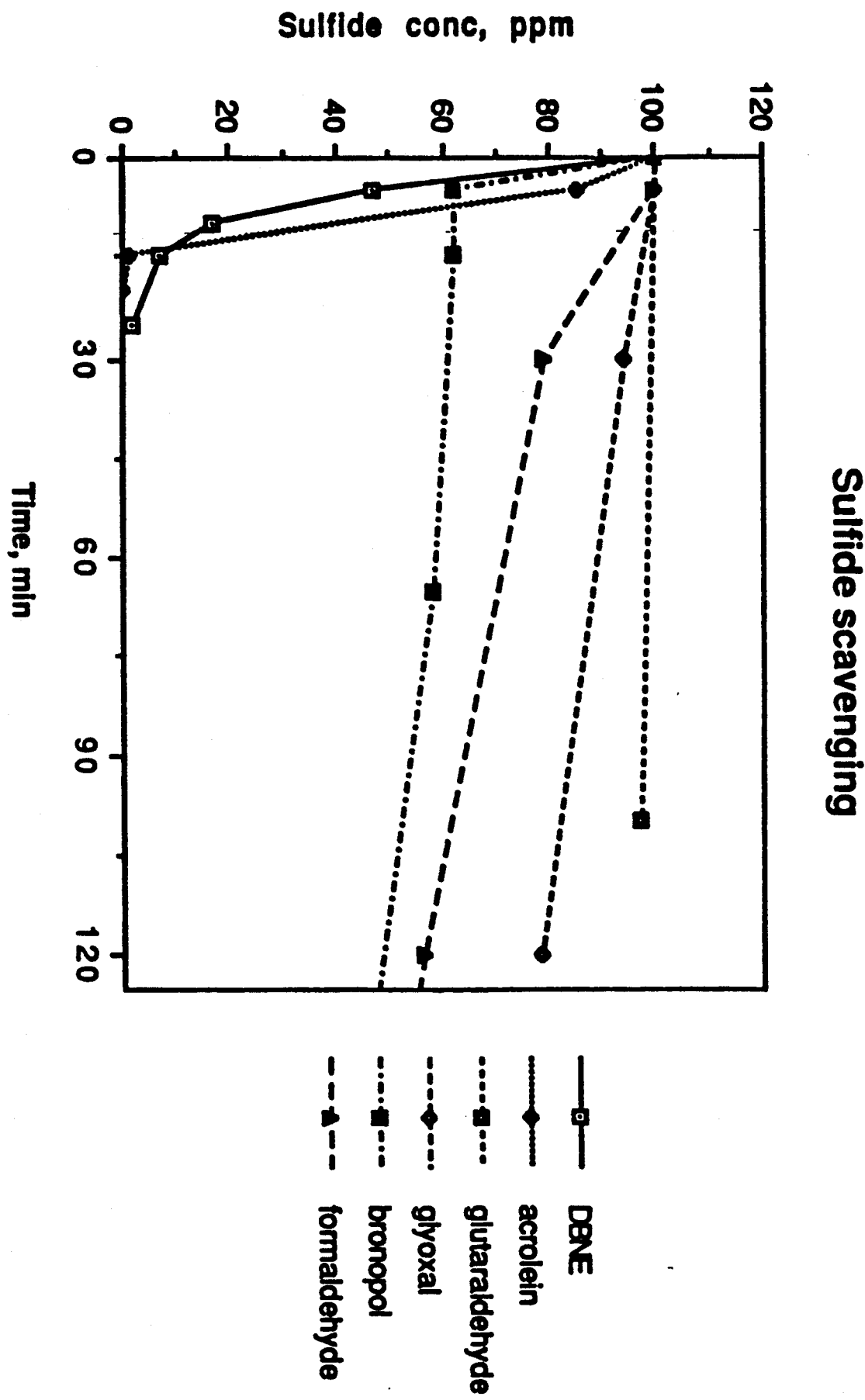

PROCESS FOR SCAVENGING SULFIDES

This application is a division of prior U.S. application Ser. No. 251,362 filed on Sept. 30, 1988, now U.S. Pat. No. 4,844,877.

FIELD OF THE INVENTION

This invention relates in general, to a process for the scavenging of sulfides. In one aspect, this invention relates to a process which utilizes certain halonitroalkanols for scavenging sulfides from solids, liquids and gases. Sulfides can be scavenged from gases or liquids, as well as as sulfides occurring as deposits in conduits, such as on metal pipe interiors. In another aspect the invention relates to novel formulations and their use in the scavenging of hydrogen sulfide and its salts from liquids such as those encountered in water treatment, pulp and paper manufacture and oil field water flooding. In a further aspect, this invention is directed to the use of 2,2-dibromo-2-nitroethanol for the scavenging of sulfides from aqueous mixtures.

BACKGROUND OF THE INVENTION

Sulfides are commonly encountered in various industrial products and processes, including cooling water, paper manufacturing, oil field flood water, and the like. While a number of compounds are currently available which are effective as scavengers for sulfides, none is completely effective in all situations, and may also have undesirable characteristics in terms of handling, toxicology, spectrum of activity, cost and the like.

For example, a number of sulfide scavengers are reported in the literature and are indicated to be effective for scavenging sulfides from water and other fluids. Most recently, U.S. Pat. No. 4,680,127 which issued in 1987 to Edmondson, discloses the use of glyoxal for reducing the amount of hydrogen sulfide in aqueous or wet gaseous media. This patent also provides a review of the prior art in this area, and particularly the utility of acrolein. The patentees refer to U.S. Pat. No. 3,459,852 which issued to Roehm and is directed to the use of acrolein and to U.S. Pat. No. 1,991,765 which disclosed the use of formaldehyde for the same purpose.

It is stated in the Edmondson patent that "acrolein is more expensive than formaldehyde as well as extremely toxic and dangerous to handle". It is also indicated that "glyoxal approaches the hydrogen sulfide scavenging rate of acrolein without the constraining handling problems presented by the use of acrolein". Indeed, acrolein has been used for some time to reduce sulfide concentrations in the production of oil and gases, but its use has been greatly hampered by problems of handling and toxicity. In contrast, the compounds employed in the process of the present invention are at least the functional equivalent of acrolein, but have the added advantage of being extremely rapid and efficient scavengers of sulfide from fluids and yet do not present the toxicity or handling problems of previous scavenger compounds, such as acrolein.

It is known that corrosion can occur in pipelines from oil wells due to the presence of hydrogen sulfide and its salts. Droplets of water can form on the interior of gas pipe lines and in the presence of sulfides can give rise to corrosive conditions. Thus, in the recovery of natural gases and in oil wells which utilize flooding operations, sulfide scavenger compounds are sometimes used to prevent or at least mimimize corrosion. Moreover, it is well known that hydrogen sulfide is toxic and hence its removal is desirable.

In U.S. Pat. No. 3,024,192, which issued Mar. 6, 1962 to E. O. Bennett et al there is disclosed an improved method in a flooding program for the recovery of oil from oil bearing subterranean formations, which utilze a halonitroalkanol such as 2-bromo-2-nitro-1,3-propandiol, 2-chloro-2-nitro-1-butanol and the like. However, the compounds are used to inhibit the growth of sulfate-reducing bacteria and not as scavengers for sulfides. Moreover, there are many instances wherein bacteria are not present in any appreciable amount but it is desired to remove sulfides present in a fluid.

Accordingly, one or more of the following objects will be achieved by the practice of the present invention. It is an object of this invention to provide a process for the scavenging of sulfides from solids and fluids. Another object of this invention is to provide a process for the scavenging of sulfides and sulfide salts from liquid and gases, particularly in industrial operations. A further object is to scavenge sulfides from solids, such as sulfide deposits on the inner surfaces of pipes. A still further object of this invention is to provide a process which avoids the use of toxic and dangerous chemicals such as acrolein in the scavenging of sulfides. A still further object of this invention is to provide a process for scavenging of sulfide which utilizes certain halonitroalkanols. Another object is to provide a process which employs 2,2-dibromo-2nitroethanol. A further object is to provide formulations useful for sulfide scavenging. Another object is to provide a method for scavenging sulfides which are present in industrial water cooling systems. It is also an object of this invention to provide a method for scavenging sulfides in industrial processes used in the production of pulp and paper. A still further object of this invention is to provide a method for using the halonitroalkanols compositions in the treatment of water employed in oil well flooding operations. These and other objects will readily become apparent to those skilled in the art in the light of the teachings herein set forth.

SUMMARY OF THE INVENTION

In its broad aspect, the invention relates to a process and formulations for the scavenging of at least one sulfide from solids and fluids containing hydrogen sulfide, organic sulfides or salts thereof. The process comprises contacting the solid or fluids with a sulfide-scavenging amount of certain halonitroalkanols, and in particular 2,2-dibromo-2-nitroethanol, hereinafter also referred to as "DBNE". The invention also relates to the use of the process in various fields of application, particularly in oil field flooding operations and industrial cooling water treatment wherein the presence of sulfides and their salts are detrimental to effective operations.

DESCRIPTION OF THE DRAWING

The single drawing is a graph showing the sulfide scavenging ability of various compounds including those disclosed for this use in the prior art.

DETAILED DESCRIPTION OF THE INVENTION

As indicated above, the process of the present invention is directed to the scavenging of sulfides from fluids using certain halonitroalkanols. The process comprises the steps of:

(a) contacting a fluid containing at least one sulfide with a sulfide-scavenging amount of a halonitroalkanol of the formula:

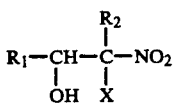

wherein:

X represents bromo or chloro;

$R_1$ represents hydrogen or substituted or unsubstituted alkyl or aryl of up to about 18, and more preferably up to about 12 carbon atoms, and wherein any substituents can be X, hydroxyl or lower alkyl; and $R_2$ represents $R_1$ or X; and (b) allowing said halonitroalkanol to react with said sulfide.

Illustrative halonitroalkanols which can be employed in the process of the present invention include, but are not limited to, compounds such as, 2-bromo-2-nitroethanol, 2,2-dibromo-2-nitroethanol, 2-bromo-2-nitro-1-propanol, 2-bromo-2-nitro-1,3-propanediol, 2,2-dibromo-2-nitro-1-phenylethanol, 3-bromo-3-nitro-2,4-pentandiol, 1,1-dibromo-1-nitro-2-propanol, 2,2-dichloro-2-nitroethanol, 2-chloro-2-nitro-1,3-propanediol, 2-bromo-2-nitro-1-phenyl-1,3-propanediol b 2-bromo-2-nitro-1-butanol, 3-bromo-3-nitro-2-butanol, 2-chloro-2-nitro-1-butanol, 1-chloro-1-nitro-2-pentanol, 1,1-dichloro-1-nitro-2-hexanol, 2-chloro-2-nitro-1-propanol, and the like.

It has also unexpectedly and surprisingly been found that of this class of halonitroalkanols, 2,2-dibromo-2-nitroethanol, DBNE, was vastly superior to other halonitroalkanols of the type disclosed in scavenging sulfides and their salts from solids and fluids.

It was therefore surprising to find that although the halonitroalkanols of the above formula were all effective as scavengers for sulfides, DBNE showed superior activity when compared to the other halonitroalkanols.

The process of the present invention will be more readily understood by reference to the single drawing which is a plot of the sulfide scavenging ability of known sulfide scavengers and the halonitroalkanols employed in the present invention. As indicated in the drawing, glutaraldehyde, gloxal and formaldehyde are not as effective in scavenging sulfides as the halonitroalkanols, such as DBNE and bronopol of the present invention. While acrolein is quite effective, it is toxic and requires special handling techniques in its use.

In practice, the halonitroalkanol, such as DBNE is employed as the major scavenger composition, and in most instances, as the sole composition for scavenging the sulfides.

The concentration of the halonitroalkanol employed in the process will of course vary depending upon the concentration of the sulfides in the fluids. Thus, the halonitroalkanol is employed in a "sulfide-scavenging amount" which is that amount necessary to scavenge sulfides and their salts. This amount can range from about 2 to about 6000, and more preferably from about 10 to about 250 parts per million, based on the total amount of the liquid or gas containing the sulfides.

As indicated above, the halonitroalkanol can be employed with other scavengers. When employed with other scavengers, the halonitroalkanol will constitute at least 2 percent by weight and not more than about 99 percent by weight of the total scavengers used. Thus, if desired, the halonitroalkanol can also be employed in admixture with other compounds capable of scavenging sulfide ions, such as glyoxal, formaldehyde and other compounds, such as chlorine dioxide, and the like.

The scavenger can also be employed in conjunction with an inert carrier in those instances where one is preferred. For example, if the sulfides are present in gases, it may be desirable to have the scavenger compound contained on a carrier such as a fixed bed through which, or over which, the gases containing the sulfides are passed or dissolved in a liquid carrier through which the gases containing the sulfides are bubbled.

The carriers can be inorganic or organic, and can be a solid or a liquid diluent in which the halonitroalkanol is dissolved or dispersed. For example, DBNE is soluble in water up to about 6 to 8 percent, and accordingly it may be feasible to employ the scavenger in the form of an aqueous solution. For other concentrations, the carriers can include, but are not limited to, organic compounds, such as, hydrocarbons, halocarbons, including dichloromethane, alcohols, glycols, aldehydes, ketones, high molecular weight glycols, and the like, and inorganic compounds, such as, diatomaceous earth, clay, pumice, and the like.

Blending of a carrier, when employed, and the halonitroalkanol compound can be effected using conventional materials handling equipment by techniques known in the art.

In practice, wherein the concentration of sulfide in the fluid is small, it is usually not necessary to remove the reaction product of the sulfide with the halonitroalkanol. However, in some instances removal may be desired and it can be effected by known separation techniques.

The halonitroalkanols used in the present invention, are conveniently prepared by one of several methods disclosed in the literature. For example, in U.S. Pat. No. 3,711,561 which issued Jan. 16, 1973 to R. Wessendorf of Germany, there is disclosed a process for preparing bromonitro alcohols of the formula:

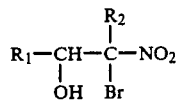

wherein $R_1$ is hydrogen, methyl or halogenated methyl and $R_2$ is hydrogen, methyl, ethyl or halogen and may be substituted with at least one of the following groups:

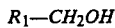

The alcohols of the indicated formula are prepared by reacting an aldehyde of the formula:

wherein $R_1$ is as indicated above, with a nitroalkanol of the formula:

wherein $R_3$ is hydrogen, methyl and ethyl and an alkali metal hydroxide. The aqueous solution of the metal alkali salt of the nitroalcohol is then reacted with bromine.

Depending upon the ratio of aldehyde and nitroalcohol employed, monohydroxy compounds or diols can be obtained. Thus for example, by reacting nitromethane with one equivalent of formaldehyde, followed by bromination, 2,2-dibromo-2-nitroethanol can be obtained.

A process for producing dibromonitro compounds is also disclosed in U.S. Pat. No. 4,723,044 which issued Feb. 2, 1988 to M. Watanabe et al and is assigned to Permachem Asia Ltd. of Tokyo, Japan. The reaction disclosed therein comprises condensing nitromethane with formaldehyde or acetaldehyde in the presence of alkali. The amount of alkali is at least 1.5 moles per mole of nitromethane. Thereafter, without isolating the product, the reaction mixture is treated with bromine, and the dibromonitro compound recovered.

As indicated above, the scavenger halonitroalkanols of the present invention are effective in scavenging hydrogen sulfide, organic sulfides and salts thereof from solids and fluids, including both gases and liquids. The liquids can be water, organic liquids or mixtures thereof. The halonitroalkanols are also particularly useful for removing iron sulfide ($Fe_xS_y$) deposits. For example, sulfide deposits on the inner surfaces of pipes, such as those used in oil well operations, heat exhangers and the like, can be removed by employing the halonitroalkanols of this invention.

In practice, as indicated above, the amount of the halonitroalkanol employed will vary depending upon a variety of considerations as well as the particular haolnitroalkanol employed. Usually the scavenger will be used in concentrations sufficient to provide from about 2 to about 1000 ppm, and more preferably from about 10 to about 250 ppm, of the halonitroalkanol in the fluids being treated. Amounts above and below these ranges can be employed and will, of course, depend upon the individual circumstances.

In those instances wherein DBNE is used as the halonitroalkanol, the amount of scavenger needed can be markedly lower than other compounds of the same class. For instance, DBNE can be used in fluids in as little as 10 ppm and still achieve excellent scavenging of sulfides.

The scavenger compositions are also effective in a very short period of time after contact with the sulfide-containing fluid. Rapid separation of sulfides is particularly important in industrial processes in which contact between the fluid and scavenger may be relatively brief. Examples of such processes include (1) treatment of cooling water and paper mill slurries (including white water), in which part of the water is periodically removed and replaced with fresh water, so that the scavenger is lost within several hours of its addition; (2) sugar processing and oil field water flooding, in which the halonitroalkanol is used in a "once-through" system, with a contact time of typically 15 minutes to 4 hours; and (3) when employed in a fixed bed system in which the contact time with the fluid is limited.

In addition to the fast reaction of the scavengers with sulfides, it has been found that they are effective at low concentrations. Thus, the scavengers of the present invention are useful in the control of sulfides in recirculating industrial fluids, such as metal working fluids, closed loop cooling water systems, and oil field produced water. It is these operations where sour water, i.e., water contaminated with sulfide ion, is encountered. Such conditions are also encountered in storage tanks where the scavengers of this invention are useful.

In the experiments which follow, distilled deionized water was used to prepare 0.1 M phosphate buffer at the indicated pH, which was then deaerated by bubbling with nitrogen gas through a porous stone for at least one hour. Deaeration is necessary due to the fact that sulfide is rapidly oxidized in oxygen-containing aqueous solutions. All subsequent operations were conducted in a glove box under an atmosphere of argon. Aqueous sodium sulfide was added to the buffer to produce a solution with the indicated concentration of sulfide, and this solution was divided into 100 gram portions, placed in screw-top bottles, and the test materials were added to each bottle. Sulfide concentrations were then monitored over time by the use of a sulfide-selective electrode connected to an ion analyzer.

The following examples are illustrative of the invention:

EXAMPLES 1-6

Following the general procedure indicated above, a 100 ppm solution of the sulfide was prepared and transferred into test bottles. To each bottle was added at a concentration of 100 ppm, the compounds set forth in Table I below. A control solution was maintained with no added sulfide scavenger. The sulfide concentrations over a period of time are indicated in table I below:

TABLE I

| Example | Test material | Time after addition in min. | Sulfide Conc. (in ppm) |
|---|---|---|---|
| 1 | Acrolein | 2 | 100 |
| | | 5 | 85 |
| | | 15 | 1 |
| | | 20 | 0 |
| 2 | Glutaraldehyde | 5 | 101 |
| | | 100 | 97 |
| 3 | DBNE | 0 | 100 |
| | | 5 | 47 |
| | | 10 | 17 |
| | | 15 | 7 |
| | | 25 | 2 |
| 4 | Bronopol | 0 | 100 |
| | | 5 | 62 |
| | | 15 | 62 |
| | | 65 | 58 |
| | | 140 | 45 |
| | | 200 | 45 |
| 5 | Glyoxal | 5 | 101 |
| | | 35 | 94 |
| | | 120 | 78 |
| | | 240 | 48 |
| | | 360 | 36 |
| 6 | Formaldehyde | 5 | 101 |
| | | 30 | 79 |
| | | 120 | 56 |
| | | 240 | 34 |

It is clearly evident from the data set forth above, the acrolein and DBNE were the most rapid and efficient scavengers of the sulfide.

EXAMPLES 7-9

In this example, the effect of pH on the sulfide scavenging ability of DBNE was investigated. Deaerated solutions were prepared as described in the above examples at pH 5, 7 and 9, containing 100 ppm of sulfide. After addition of 100 ppm of DBNE, the sulfide concentrations were reduced as set forth in Table II below:

TABLE II

| Example | pH | Sulfide concentration after 5 minutes | 45 minutes |
|---|---|---|---|
| 7 | 5 | 16 | 4 |
| 8 | 7 | 15 | 1 |
| 9 | 9 | 13 | 3 |

It is evident from the data in table II that pH has little effect on the ability of this material to scavenge sulfide. The control solutions showed no reduction in sulfide concentrations over the course of the experiments. However, it was noted that the mixtures remained transparent when the experiments were conducted at pH 9, and were somewhat cloudy at the lower pH's. This effect may prove useful in applications in which the cloudiness is unacceptable.

EXAMPLE 10

Since it may be desirable to reduce the concentrations of sulfide in industrial solutions which contain low levels of $H_2S$, reactivity of DBNE with 10 ppm of sulfide was investigated. When pH 7 solutions containing 10 ppm of sulfide treated with 100 ppm DBNE, sulfide concentrations were reduced to less than 1 ppm within 5 minutes. Addition of 10 ppm of DBNE to the sulfide solutions reduced the sulfide concentrations to less than 1 ppm 15 minutes. Again, control solution showed no reduction in sulfide concentrations in the absence of DBNE.

The total sulfide scavenging capacity of a 100 ppm DBNE solution was then determined. When 500 ppm of sulfide was added to such a solution, sulfide concentrations were observed to decrease in the manner set forth in Table III below:

TABLE III

| Time | Sulfide Concentration (ppm) |
|---|---|
| 0 | 500 |
| 5 min. | 208 |
| 30 min. | 222 |
| 5 hours. | 170 |

It is evident from the data, the DBNE has the ability to scavenge over the three times its own weight of sulfide from aqueous solutions.

EXAMPLE 11

This example demonstrates the ability of DBNE to remove solid sulfide deposits. In this experiment, *Desulfovibrio desulfuricans* was inoculated into two SRB vials (anaerobic vials containing nutrient media and an iron nail) and allowed to grow for one week at 37° C. The resulting bacterial growth produced hydrogen sulfide, which reacted with the iron nail to produce a dense suspension of black solid (iron sulfide), and a black coating on the iron nail. The two vials were purged with argon for several minutes to remove excess hydrogen sulfide. DBNE was then added to one vial, and acrolein was added to the other vial, in quantities suficient to provide maximum concentrations of 6000 ppm of each chemical. Each vial was mixed briefly by inversion. The results were that the vial treated with DBNE rapidly lost the black color of iron sulfide; almost all of the black deposits were gone within 30 minutes. By contrast, no change was observed in the vial treated with acrolein, even after 24 hours.

Although the invention has been illustrated by the preceding examples, it is not to be construed as being limited to the materials employed therein, but rather, the invention relates to the generic area as a whole. Various modifications and embodiments thereof can be made without departing form the spirit or scope thereof.

What is claimed is:

1. A process for the scavenging of at least one sulfide from solids and liquids which comprises the steps of:
   (a) contacting a solid or liquid containing at least one sulfide with a sulfide-scavenging amount of a dihalonitroalkanol of the formula:

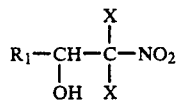

wherein:
   X represents bromo or chloro; and
   $R_1$ represents hydrogen or substituted or unsubstituted alkyl or aryl of up to about 18 carbon atoms, and wherein any substituents are selected from the group consisting of X, hydroxyl or lower alkyl; and
   (b) allowing said dihalonitroalkanol to react with said sulfide.

2. The process of claim 1 wherein X represents bromo and $R_1$ represents hydrogen or a member selected from the group consisting of methyl, ethyl, propyl and phenyl groups.

3. The process of claim 2 wherein said dihalonitroalkanol is 2,2-dibromo-2-nitroethanol.

4. The process of claim 1 wherein said liquid is an aqueous liquid.

5. The process of claim 1 wherein said sulfide is hydrogen sulfide or a salt.

6. The process of claim 1 wherein said liquid is industrial cooling water or water employed in oil field operations.

7. The process of claim 1 wherein said liquid is an aqueous mixture containing hydrogen sulfide and its salts.

8. The process of claim 1 wherein said dihalonitroalkanol is employed in an amount of from about 2 to about 6000 parts per million.

9. A process for the scavenging of at least one sulfide from solids and non-aqueous liquids which comprises the steps of:
   (a) contacting a solid or non-aqueous liquid containing at least one sulfide with a sulfide-scavenging amount of a halonitroalkanol of the formula:

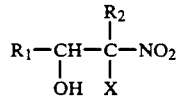

wherein:
   X represents bromo or chloro;
   $R_1$ represents hydrogen or substituted or unsubstituted alkyl or aryl of up to about 18 carbon atoms, and wherein any substituents are selected from the group consisting of X, hydroxyl or lower alkyl; and
   $R_2$ represents $R_1$ or X; and
   (b) allowing said halonitroalkanol to react with said sulfide.

10. The process of claim 9 wherein said sulfide is removed from a non-aqueous liquid.

11. The process of claim 9 wherein X represents bromo, $R_1$ represents hydrogen or a member selected from the group consisting of methyl, ethyl, propyl and phenyl groups, and $R_2$ represents bromo or $R_1$.

12. The process of claim 11 wherein said solid is the inner surface of a pipe.

13. The process of claim 11 wherein said halonitroalkanol is 2,2-dibromo-2-nitroethanol or 2-bromo-2-nitro-1,3-propanediol.

14. The process of claim 9 wherein said sulfide is scavenged from a solid.

15. The process of claim 9 wherein said sulfide is hydrogen sulfide or a salt.

16. The process of claim 9 wherein said halonitroalkanol is employed in an amount of from about 2 to about 6000 parts per million.

17. A process for the scavenging of at least one sulfide from solids and liquids which comprises the steps of:

(a) contacting a solid or liquid containing at least one sulfide with a sulfide-scavenging amount of a halonitroalkanol of the formula:

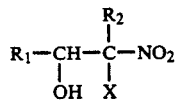

wherein:

X represents bromo or chloro;

$R_1$ represents hydrogen or substituted or unsubstituted alkyl or aryl of up to about 18 carbon atoms, and wherein any substituents are selected from the group consisting of X, hydroxyl or lower alkyl; and $R_2$ represents $R_1$ or X; and wherein said halonitroalkanol is employed in conjunction with a carrier; and (b) allowing said halonitroalkanol to react with said sulfide.

18. The process of claim 17 wherein said carrier is an inert solid carrier.

19. The process of claim 17 wherein said carrier is an inert liquid carrier.

20. The process of claim 17 wherein X represents bromo, $R_1$ represents hydrogen or a member selected from the group consisting of methyl, ethyl, propyl and phenyl groups, and $R_2$ represents bromo or $R_1$.

21. The process of claim 20 wherein said halonitroalkanol is 2,2-dibromo-2-nitroethanol or 2-bromo-2-nitro-1,3-propanediol.

22. The process of claim 17 wherein said sulfide is hydrogen sulfide or a salt.

23. The process of claim 17 wherein said liquid is industrial cooling water or water employed in oil field operations.

24. The process of claim 17 wherein said halonitroalkanol is employed in an amount of from about 2 to about 6000 parts per million.

* * * * *